United States Patent
Lee et al.

(10) Patent No.: US 7,145,621 B2
(45) Date of Patent: Dec. 5, 2006

(54) FRINGE FIELD SWITCHING LIQUID CRYSTAL DISPLAY HAVING SAWTOOTH EDGES ON THE COMMON AND PIXEL ELECTRODES AND ON THE CONDUCTIVE BLACK MATRIX

(75) Inventors: Kyung Ha Lee, Kyoungki-do (KR); Chi Wook An, Kyoungki-do (KR)

(73) Assignee: Boe Hydis Technology Co., Ltd., Kyoungki-do (KR)

(*) Notice: Subject to any disclaimer, the term of this patent is extended or adjusted under 35 U.S.C. 154(b) by 135 days.

(21) Appl. No.: 10/939,761

(22) Filed: Sep. 13, 2004

(65) Prior Publication Data

US 2005/0179846 A1    Aug. 18, 2005

(30) Foreign Application Priority Data

Feb. 16, 2004    (KR) ............... 10-2004-0010118

(51) Int. Cl.
G02F 1/1343    (2006.01)
G02F 1/1333    (2006.01)

(52) U.S. Cl. ................... 349/141; 349/111

(58) Field of Classification Search ........... 349/141, 349/111

See application file for complete search history.

(56) References Cited

U.S. PATENT DOCUMENTS 5,946,066 A * 8/1999 Lee et al. .............. 349/141
6,538,713 B1 * 3/2003 Yanagawa et al. ....... 349/146
6,587,170 B1 * 7/2003 Shin et al. .............. 349/110
6,784,965 B1 * 8/2004 Kim et al. .............. 349/141
6,839,114 B1 * 1/2005 Moon et al. ............ 349/141

FOREIGN PATENT DOCUMENTS

KR    20020085237    11/2002

* cited by examiner

Primary Examiner—Andrew Schechter
Assistant Examiner—Nathanael Briggs
(74) Attorney, Agent, or Firm—Ladas & Parry LLP

(57) ABSTRACT

Disclosed is a fringe field switching liquid crystal display, which prevents disclination lines from being created at a wedge section and improves liquid crystal polarization efficiency of a pixel electrode. The fringe field switching liquid crystal display comprises upper and lower substrates arranged while forming a space between them, a conductive black matrix formed on a lower surface of the upper substrate, a common electrode formed on an upper surface of the lower substrate, a gate insulation layer formed on an upper surface of the common electrode, and a pixel electrode formed on an upper surface of the gate insulation layer. Herein, the pixel electrode forms an electric field and includes a fringe portion having a saw-tooth shape, which forms one of 1-domain and 2-domain among the pixel electrode, the conductive black matrix, and the common electrode.

3 Claims, 4 Drawing Sheets

FRINGE FIELD SWITCHING LIQUID CRYSTAL DISPLAY HAVING SAWTOOTH EDGES ON THE COMMON AND PIXEL ELECTRODES AND ON THE CONDUCTIVE BLACK MATRIX

BACKGROUND OF THE INVENTION

1. Field of the invention

The present invention relates to a liquid crystal display, and more particularly to a fringe field switching liquid crystal display (hereinafter, simply referred to as 'FFS-LCD') in which the polarization efficiency of liquid crystal is improved by using an electric field applied to a black matrix, a common electrode, and a pixel electrode.

2. Description of the Prior Art

FIG. 1 is a plan view illustrating a conventional FFS-LCD. In addition, FIG. 2 is an enlarged view of an 'A' portion shown in FIG. 1, and FIG. 3 is a sectional view illustrating the conventional FFS-LCD shown in FIG. 1.

According to the conventional FFS-LCD, as shown in FIGS. 1 to 3, a second ITO electrode 104 overlapped on a first ITO electrode 102 is fabricated in a comb-teeth pattern, and the alignment of liquid crystal is aligned at 0°. Therefore, when liquid crystal molecules are twisted by an electric field, upper liquid crystal molecules and lower liquid crystal molecules are twisted in opposite directions from each other, thereby compensating for the chromatic shift of a bluish color or a yellowish color caused by dielectric anisotropy of the liquid crystal.

According to the conventional FFS-LCD having the above construction, since an overlapped region between electrodes is very wide, layers such as insulation layers may be deteriorated if the conventional FFS-LCD operates for a long period of time, causing inferior afterimages. In order to correct such a disadvantage, various shapes and structures of electrodes have been studied and proposed.

According to conventional FFS pixels, a pixel wedge for the FFS pixels is not located in the black matrix 106 but located in the real transmission region. Therefore, transmittance is reduced due to such a relationship between the pixel wedge and the black matrix 106, and luminance is not uniform due to an alternation operation between the pixel wedge and the black matrix 106, thereby deteriorating the characteristics of manufactured goods.

SUMMARY OF THE INVENTION

Accordingly, the present invention has been made to solve the above-mentioned problems occurring in the prior art, and an object of the present invention is to provide a fringe field switching liquid crystal display, in which a black matrix has low resistance so that an electric field and pixels are formed by using a conductive material in order to operate peripheral liquid crystal molecules without creating disclination lines in the vicinity of a wedge section, and in which, a common electric field is applied to a black matrix region so as to form the electric field between the black matrix and a pixel electrode, so that liquid crystal molecules aligned between a data line and the pixel electrode are operated, thereby improving the liquid crystal polarization efficiency of a pixel electrode.

In order to accomplish this object, there is provided a fringe field switching liquid crystal display comprising: upper and lower substrates arranged while forming a space between the upper and lower substrates; a conductive black matrix formed on a upper surface of the upper substrate except for a predetermined region of the upper substrate; a common electrode formed on an upper surface of the lower substrate; a gate insulation layer formed on an upper surface of the common electrode; and a pixel electrode formed on an upper surface of the gate insulation layer, wherein the pixel electrode forms an electric field having a predetermined angle in a predetermined direction together with the conductive black matrix and the common electrode as voltage is applied thereto such that the electric filed is applied to liquid crystal, and the pixel electrode includes a fringe portion having a saw-tooth shape, which forms one of 1-domain and 2-domain between the conductive black matrix and the common electrode.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
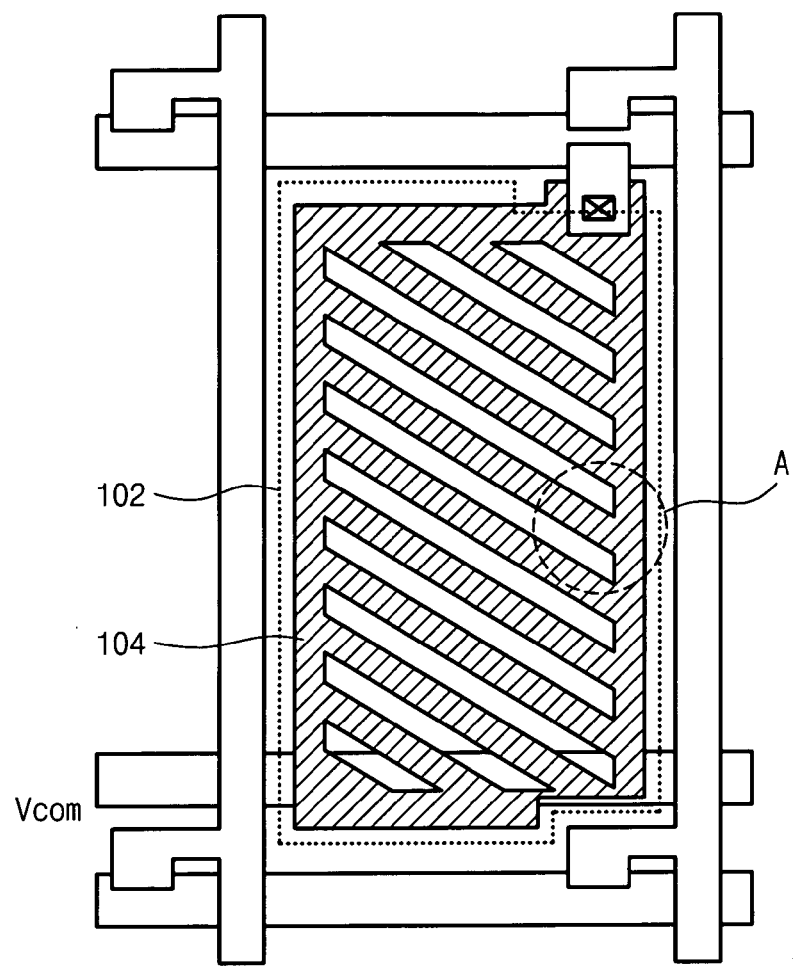
FIG. 1 is a plan view illustrating a conventional FFS-LCD (Fringe field Switching Liquid Crystal Display)
Figure 2:
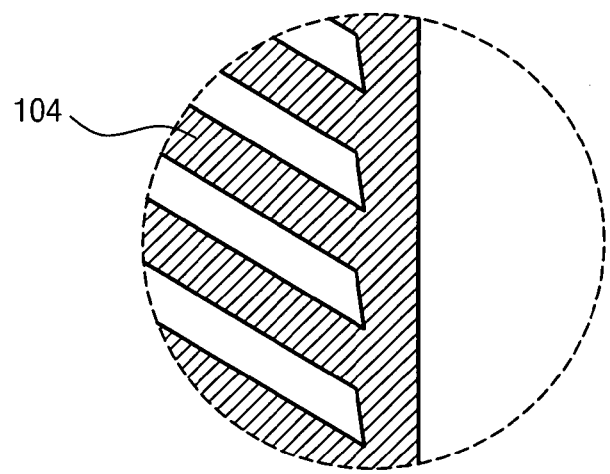
FIG. 2 is an enlarged view of a region 'A' shown in FIG. 1.
Figure 3:
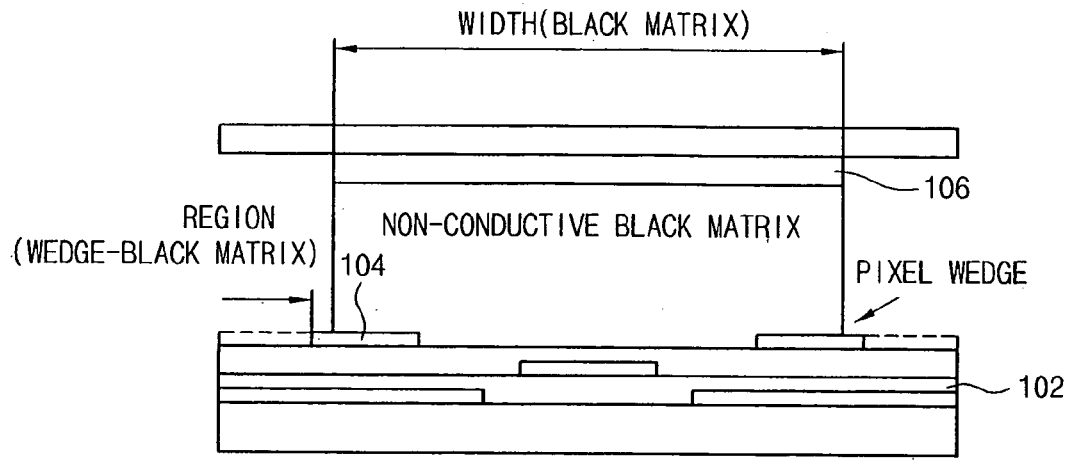
FIG. 3 is a sectional view illustrating the conventional FFS-LCD shown in FIG. 1.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 4:
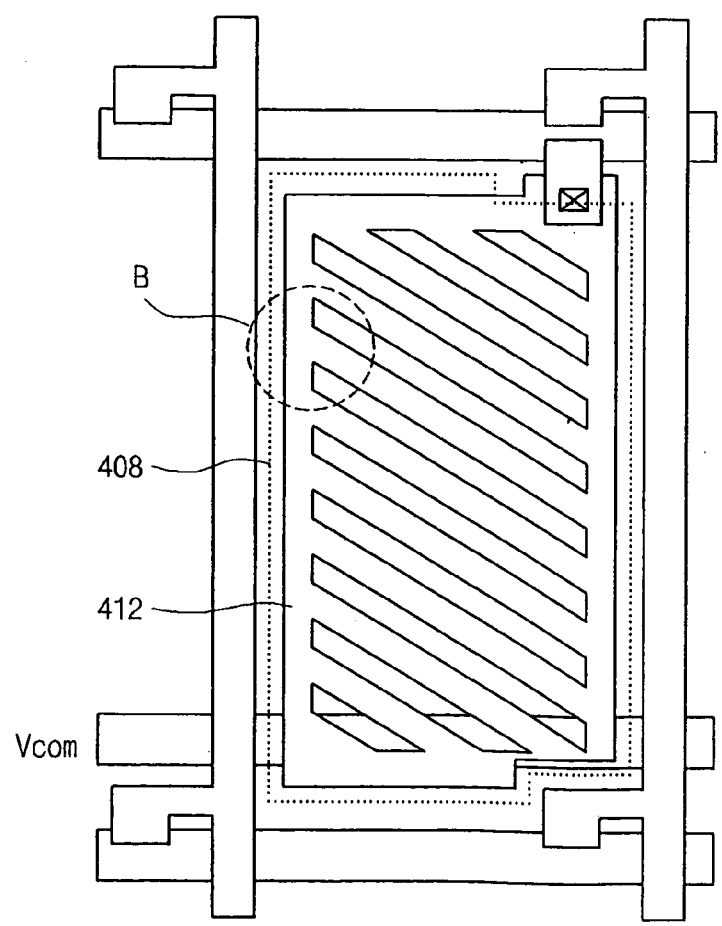
FIG. 4 is a plan view illustrating an FFS-LCD according to a first embodiment of the present invention.
Figure 5:
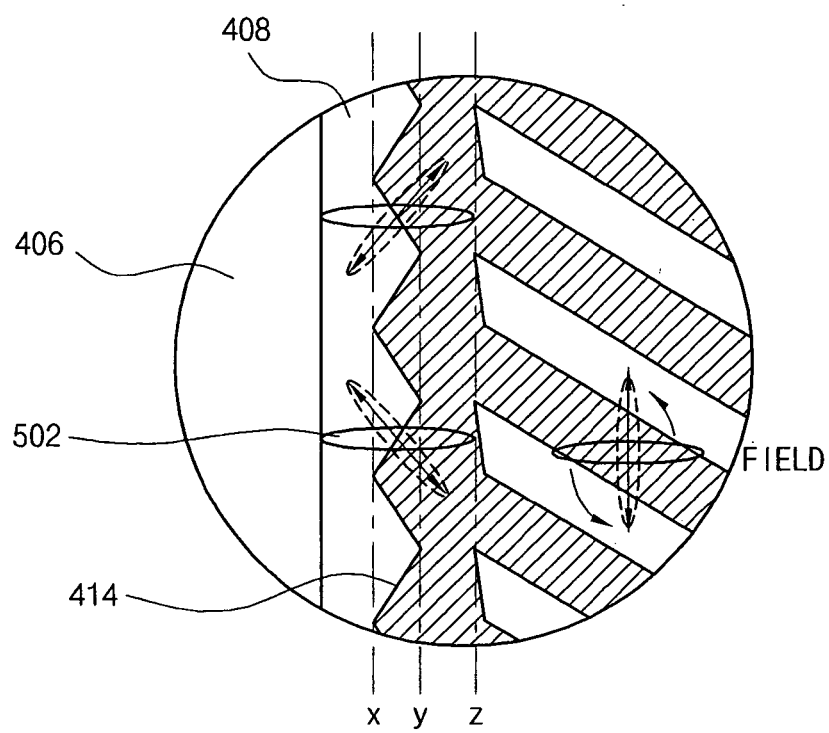
FIG. 5 is an enlarged view of a region 'B' shown in FIG. 4.
Figure 6:
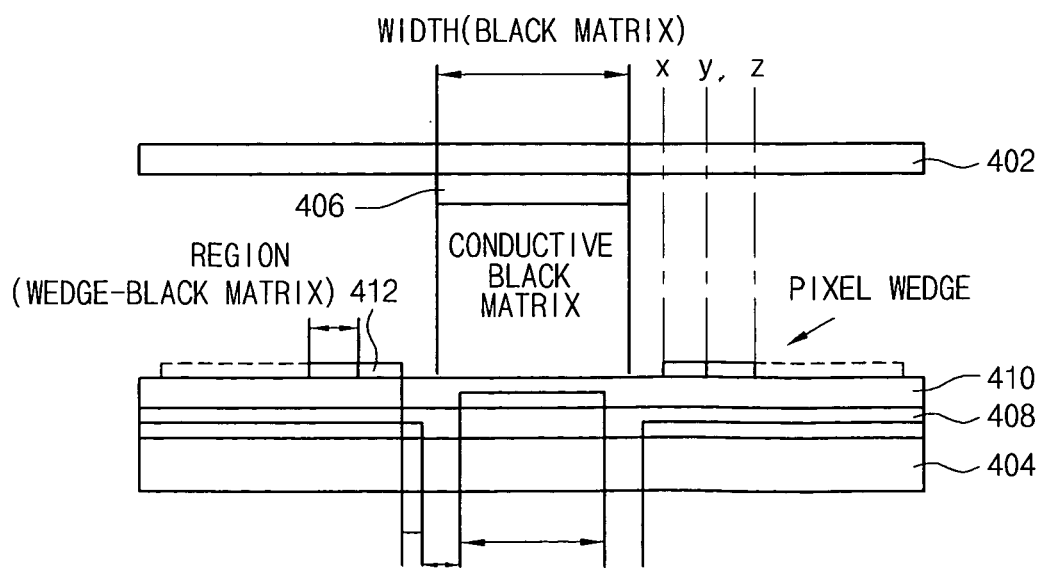
FIG. 6 is a sectional view illustrating the FFS-LCD shown in FIG. 4.

FIG. 4 is a plan view illustrating a fringe field switching liquid crystal display (hereinafter, referred to as 'FFS-LCD') according to a first embodiment of the present invention. In addition, FIG. 5 is an enlarged view of a region 'B' shown in FIG. 4, and FIG. 6 is a sectional view illustrating the FFS-LCD shown in FIG. 4.

According to the first embodiment of the present invention, the FFS-LCD includes an upper substrate 402, a low substrate 404, a conductive black matrix 406, a common electrode 408, a gate insulation layer 410, and a pixel electrode 412.

The upper substrate 402 and the lower substrate 404 are arranged with a space between them. The conductive black matrix 406 is formed on a upper surface of the upper substrate 402 except for a predetermined region of the upper substrate 402. The common electrode 408 is formed on an upper surface of the lower substrate 404. The gate insulation layer 410 is formed on an upper surface of the common electrode 408.

The pixel electrode 412 is formed on an upper surface of the gate insulation layer 410. When a voltage is applied to the pixel electrode 412, the pixel electrode 412 forms an electric field, which has a predetermined angle, together with the conductive black matrix 406 and the common electrode 408, in which the electric field is applied to liquid crystal. In addition, the pixel electrode 412 includes a fringe portion 414 of a saw tooth shape, which forms one of 1-domain and 2-domain, between the conductive black matrix 406 and the common electrode 408.

Referring to FIGS. 4 and 5, it is preferred that a ratio of 'x', 'y' and 'z' is 1:1:1. Herein, 'x' represents a distance between the conductive black matrix 406 and the pixel electrode 412, 'y' represents a length of the saw-tooth shaped fringe portion 414 of the pixel electrode 412, and 'z' represents a length of the pixel electrode 412 except for the fringe portion 414 thereof.

The operation of the FFS-LCD according to the first embodiment of the present invention will now be explained with reference to FIGS. 4 to 6.

When a power source is powered off, liquid crystal 502 is fixed in a horizontal direction (0°) and is established to prevent light from leaking.

When a power source is powered on, an electric field is formed in a vertical direction between the common electrode 408 and the pixel electrode 412, and the electric field is applied to the liquid crystal 502. At this time, an electrode is formed so as to form a domain among the conductive black matrix 406, the common electrode 408, and the pixel electrode 412 as shown in FIG. 5, so that a viewing angle can be improved while preventing a color shift phenomenon, as compared with the conventional art.

Figure 7:
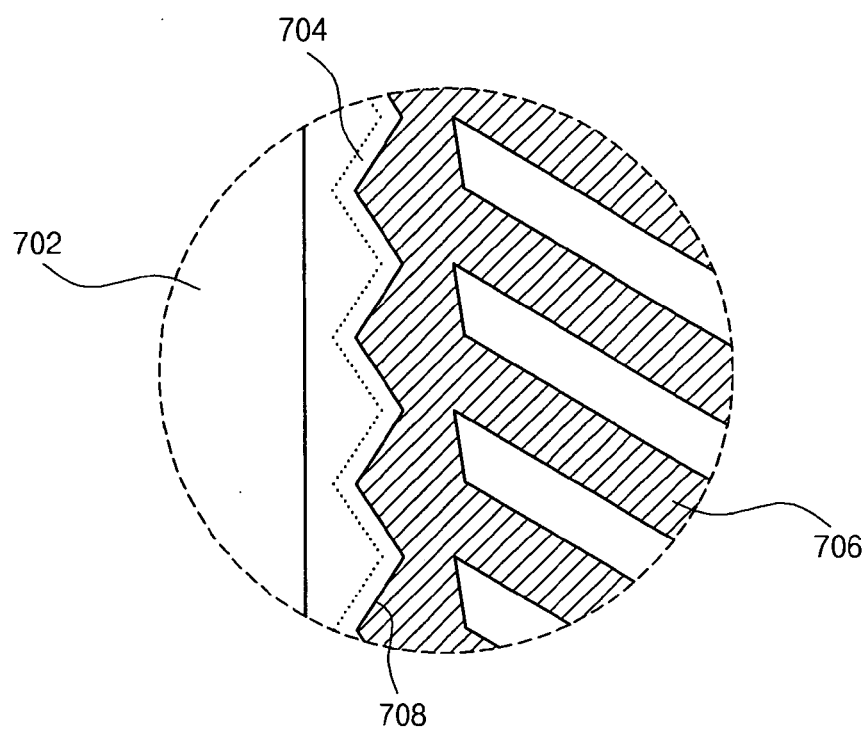
FIG. 7 is a view illustrating a black matrix, a common electrode, and a pixel electrode according to a second embodiment of the present invention.

FIG. 7 is a view illustrating a black matrix 702, a common electrode 704, and a pixel electrode 706 according to a second embodiment of the present invention. The pixel electrode 706 includes a fringe portion 708 of a saw-tooth shape.

When the common electrode 704 is located within the black matrix 702, it is preferred that a ratio of 'x':'y':'z' is 1:1:1. Herein, 'x' represents a distance between the black matrix 702 and the pixel electrode 706, 'y' represents a length of the saw-tooth shaped fringe portion 708 of the pixel electrode 706, and 'z' represents a length of the pixel electrode 706 except for the fringe portion 708 thereof.

Figure 8:
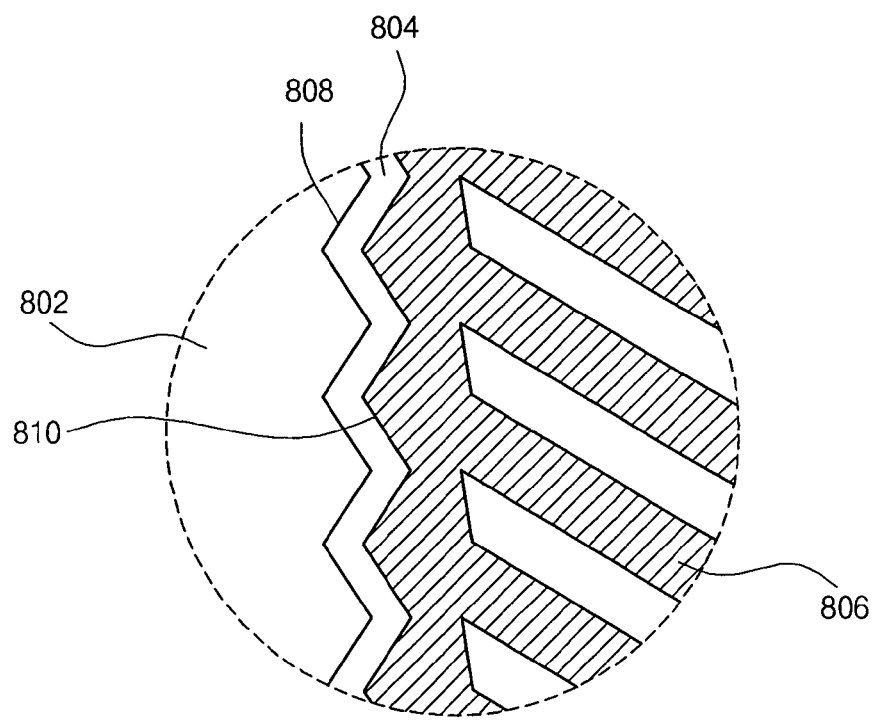
FIG. 8 is a view illustrating a black matrix, a common electrode, and a pixel electrode according to a third embodiment of the present invention.

FIG. 8 is a view illustrating a black matrix 802, a common electrode 804, and a pixel electrode 806 according to a third embodiment of the present invention. The black matrix 802 includes a fringe portion 808 of a saw-tooth shape. In addition, the pixel electrode 806 includes a fringe portion 810 of a saw-tooth shape.

The common electrode 804 is located out of the black matrix 802. In this case, it is preferred that a ratio of 'x':'y':'z' is 1:2:2. Herein, 'x' represents a distance between the black matrix 802 and the pixel electrode 806, 'y' represents a length of the saw-tooth shaped fringe portion 810 of the pixel electrode 806, and 'z' represents a length of the pixel electrode 806 except for the fringe portion 810 thereof.

As described above, there are provided constructions of FFS-LCDs, which have higher transmittances, as compared with the conventional art, by modifying a shape of a black matrix and/or a pixel wedge section. That is, it is possible to improve the transmittance by reducing the width of the black matrix. By increasing the transmission efficiency of the black matrix, it is possible to reduce the power consumption. Also, a viewing angle can be improved while preventing a color shift phenomenon by a 2-domain effect created among a black matrix, a common electrode, and a pixel electrode. The viewing angle can be additionally improved due to a function of an outer peripheral portion of such a black matrix, and the black matrix region can be minimized by combination of a common electrode, pixels, and a black matrix. In addition, according to the present invention, it is possible to reduce non-uniformity of peripheral liquid crystal, which has been problematic in the conventional art.

Moreover, it is possible to control an electric field, which is applied to a black matrix, by connecting an exterior common electrode to the black matrix so that a signal may be applied to the black matrix. In addition, it is possible to reduce disclination lines of a black matrix side by restricting the size of an electric field to be applied to signal lines.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A fringe field switching liquid crystal display comprising:
   upper and lower substrates arranged while forming a space between the upper and lower substrates;
   a conductive black matrix formed on a upper surface of the upper substrate except for a predetermined region of the upper substrate said conductive black matrix having a saw-tooth shaped fringe portion;
   a common electrode formed on an upper surface of the lower substrate, said common electrode having a saw-tooth shaped fringe portion, edges of which align with the edges of the conductive black matrix saw-tooth fringe portion;
   a gate insulation layer formed on an upper surface of the common electrode; and
   a pixel electrode formed on an upper surface of the gate insulation layer, wherein the pixel electrode forms an electric field having a predetermined angle in a predetermined direction together with the conductive black matrix and the common electrode as voltage is applied thereto such that the electric filed is applied to liquid crystal, and the pixel electrode includes a fringe portion having a saw-tooth shape the edges of which align with the edges of the common electrode saw-tooth shaped fringe portion and, which forms one of 1-domain and 2-domain between the conductive black matrix and the common electrode.

2. The fringe field switching liquid crystal display as claimed in claim 1, wherein, when 'x' represents a distance between the black matrix and the pixel electrode, 'y' represents a length of the saw-tooth shaped fringe portion of the pixel electrode, and 'z' represents a length of the pixel electrode except for the fringe portion of the pixel electrode, a ratio of 'x':'y':'z' is 1:1:1.

3. The fringe field switching liquid crystal display as claimed in claim 1, wherein, when 'x' represents a distance between the black matrix and the pixel electrode, 'y' represents a length of the saw-tooth shaped fringe portion of the pixel electrode, and 'z' represents a length of the pixel electrode except for the fringe portion of the pixel electrode, a ratio of 'x':'y':'z' is 1:1:1 if the common electrode is located within a region of the conductive black matrix, and a ratio of 'x':'y':'z' is 1:2:2 if the common electrode is located out of the region of the conductive black matrix.

* * * * *